Figure 1:
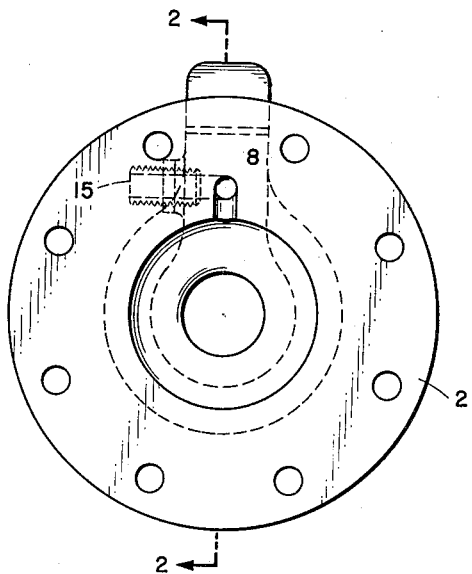

Dec. 19, 1961  T. W. W. O'KEEFFE  3,013,432
VENTURI TUBES
Filed June 11, 1959  2 Sheets-Sheet 1

INVENTOR:
TERENCE W. W. O'KEEFFE
BY: *N. D. Birch*
HIS ATTORNEY

Dec. 19, 1961 T. W. W. O'KEEFFE 3,013,432
VENTURI TUBES
Filed June 11, 1959 2 Sheets-Sheet 2

INVENTOR:
TERENCE W. W. O'KEEFFE
BY: H.D. Birch
HIS ATTORNEY de# United States Patent Office 3,013,432
Patented Dec. 19, 1961

3,013,432
VENTURI TUBES
Terence W. W. O'Keeffe, London, England, assignor to Shell Oil Company, a corporation of Delaware
Filed June 11, 1959, Ser. No. 819,713
Claims priority, application Great Britain June 17, 1958
1 Claim. (Cl. 73—213)

The present invention relates to venturi tube devices. In particular, this invention relates to venturi tube devices having a pressure sensing line which opens into the throat of the venturi tube, not necessarily at its narrowest point, and which is arranged so that in operation the fluid pressure in it is the static pressure in the throat at the point where the line opens into it. In, for example, aircraft refueling systems, a venturi tube device of this nature is often incorporated in a conduit leading to a hose terminating in a discharge nozzle, the pressure drop at the venturi tube throat being made equal to that along the hose and the magnitude of the pressure in the pressure sensing line of the venturi device being used to indicate and usually also to exert a control dependent upon the magnitude of the pressure at the discharge nozzle, for example, to open a valve in a pump by-pass line as the nozzle is closed. This avoids the necessity of using an unsatisfactory arrangement in which a pressure sensing line is run from the end of the hose back to the apparatus from which the hose is supplied. Systems in which such venturi tube devices are employed are described in U.S. Patent 2,829,664.

Where it is required to use different hose and nozzle combinations, of different length or diameter for example, with a given system, the pressure drop in the hose will vary so that it therefore becomes necessary either to provide a different venturi tube device for each combination or a venturi tube device in which the magnitude of the control pressure for a given flow rate can be varied. The latter arrangement is usually preferable and venturi tube devices are known in which the position of the inlet to the pressure sensing line can be varied relative to the narrowest part of the throat in the venturi tube. Such venturi tube devices, however, have disadvantages arising from the fact that the position of the pressure sensing line has to be varied relative to the tube itself and consequently some form of liquid-tight gland permitting this movement has to be provided where the sensing line passes out of the tube. Such glands often prove to be unsatisfactory in operation.

According to the present invention a venturi tube device comprises a venturi tube, a pressure sensing line opening into the throat of the tube, a branch line from the pressure sensing line opening into the venturi tube at a point where it is of greater cross-section than that at which the pressure sensing line opens into the throat, and a control valve in the branch line which is adjustable between a position in which the branch line is closed to one in which it is open by a predetermined amount, for example fully open.

Preferably the branch line opens into the venturi tube up-stream of the throat and where the tube is of the full diameter, having regard to the normal direction of liquid flow.

The control valve, the branch line and the initial part of the pressure sensing line may all be provided in a single mounting projecting from and integral with the exterior of the wall of the venturi tube.

The venturi tube device is preferably provided with flanges or other coupling members at both ends to enable it to be jointed into a pipeline and, for lightness, the device may be constructed wholly or in part of aluminum alloy.

In some cases it may be found advantageous to include a second valve, this being positioned in the pressure sensing line between the throat of the venturi tube and the junction with the branch line and operable in the opposite sense to the control valve in the branch line so that it is open when the latter is closed and vice versa. Preferably the two valves are coupled to be adjusted simultaneously.

Figure 2:
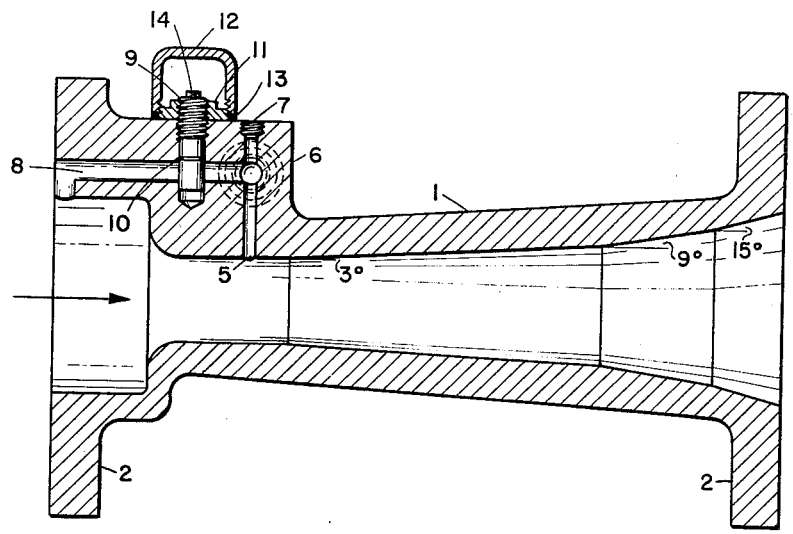
Figure 3:
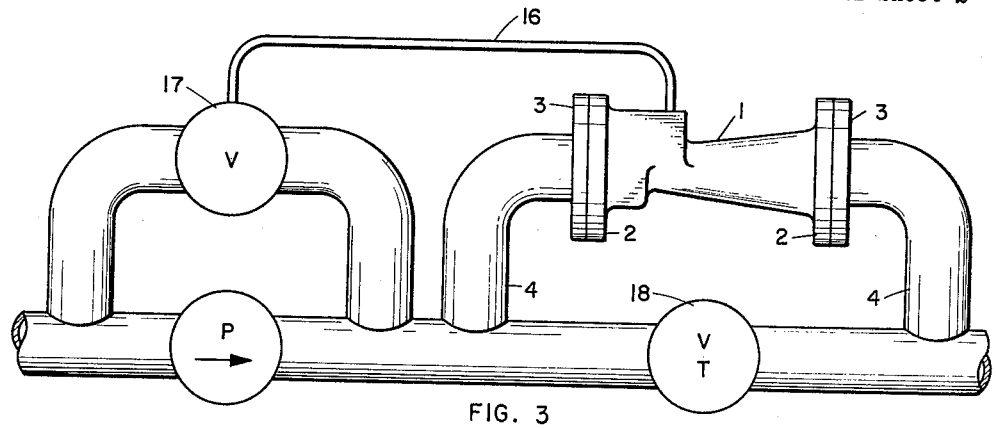
Figure 4:
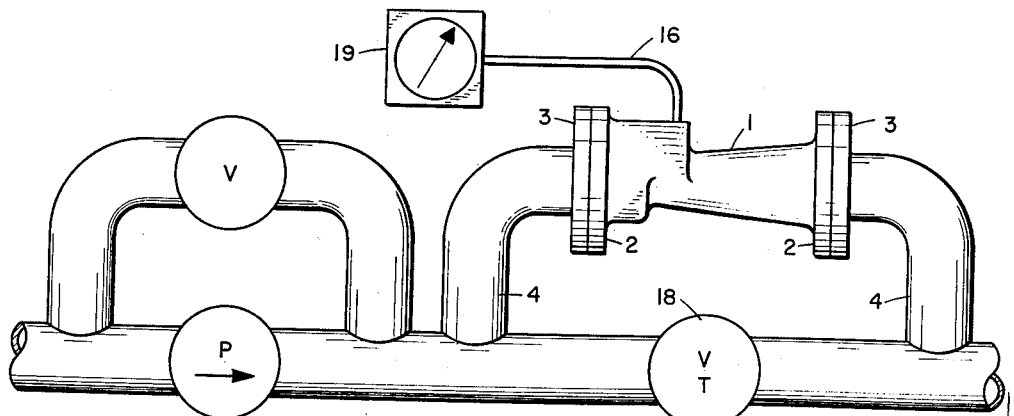
Figure 5:
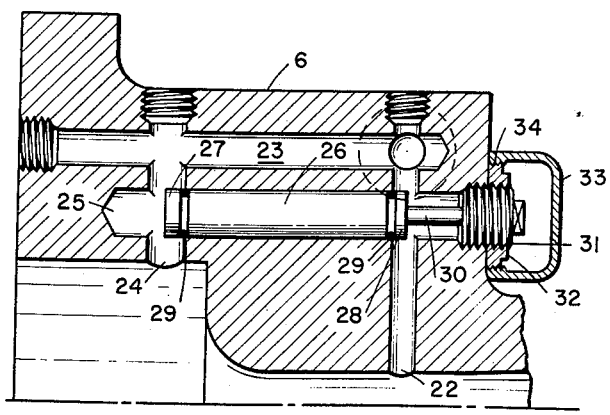

A venturi tube device according to the present invention will now be described by way of example with reference to the accompanying drawings in which:

FIG. 1 shows an end view of the venturi tube device;
FIG. 2 shows a sectional side view of the venturi tube device on the line 2—2 of FIG. 1;
FIG. 3 shows a diagrammatic arrangement of a venturi tube device including a pressure operated valve and incorporated in a refueling system;
FIG. 4 shows a modification of the arrangement shown in FIG. 3 in which the device includes a pressure measuring and/or recording apparatus; and
FIG. 5 shows a fragmentary sectional side view of a modified venturi tube device.

The venturi tube itself is of aluminum alloy and is of conventional design and is intended for inclusion in a four inch internal diameter pipeline. Referring to FIG. 2 and starting from the upstream end of the venturi tube 1, there is a 2" length of the full 4" diameter bore and then a shoulder at which the diameter is reduced to 1.75", this being the diameter of the narrowest part of the throat of the venturi tube 1 which part is 1.75" long. The shoulder is radial but the inner corner is rounded to a radius of 0.625". Downstream of the throat there are three successive divergent sections, the first diverging from a diameter of 1.75" to one of 2.5" with a semi cone-angle of 3°, the second from a diameter of 2.5" to one of 3.25" with a semi cone-angle of 9°, and the third from a diameter of 3.25" to one of 4" (the full diameter) with a semi cone-angle of 15°. The lengths of these three sections are approximately 7⅛", 2⅜" and 1⅜", respectively. The overall length of the tube 1 is 15¼".

Each end of the tube is provided with a 9" diameter flange 2 drilled with eight holes for securing it by nuts and bolts to a similar flange on an adjoining length of pipeline 4 (see FIGS. 3 and 4).

The initial section of a pressure sensing line 5 (see FIG. 2), ¼" in diameter, opens into the throat of the venturi tube 1 just before the downstream end of the narrowest part of the throat. The pressure sensing line 5 extends radially outwards through a mounting 6 which projects from the exterior of the wall of the venturi tube 1, and is provided with a plug 7 at its outer end. In addition, a branch line 8 of ⅜" diameter leads from a junction with the pressure sensing line 5, through the mounting 6 to open into the upstream end of the full diameter first section of the venturi tube 1. At an intermediate point along the length of the branch line 8, there is provided a control valve comprising simply a cylindrical valve member 9 and an O-ring 10. The valve member 9 can be screwed down into a ½" diameter bore intersecting the branch line 8 at right angles, so as to block the latter completely. Unscrewing the valve member 9 progressively unblocks the branch line 8 until its full bore is unobstructed. The outer end of the valve member 9 projects out of the mounting 6 and is screw-threaded on its external surface, so that a lock nut 11 may be screwed on to it and tightened against the external surface of the mounting 6 to lock the valve member 9 in any desired position. To ensure against leakage of liquid in operation, a sealing cap 12 is screwed down over the lock nut 11 which is formed with an external screw thread for this purpose, a gasket 13, inserted under the rim of the sealing cap 12, being clamped against the outer surface of the mounting 6. The extreme outer end of the valve member 9 may be provided with some means for facilitating its adjustment such as an integral nut 14 or a slot for a screwdriver.

At the junction with the branch line 8, the pressure sensing line 5 bends at right angles, the continuation being at right angles to the branch line 8 also, and leads to an internally screw-threaded opening 15 (see FIG. 1), arranged to receive a union or joining to a narrow bore tube 16 (see FIGS. 3 and 4) of 3/8" diameter. This tube 16, when the device is incorporated in an aircraft refueling system will be connected to a pressure operated valve 17 (see FIG. 3) so that the pressure in the venturi tube 1 controls the operation of the valve. Thus, in a system such as that described in U.S. Patent 2,829,644, the device is incorporated in the fuel line in parallel with a spring-loaded throttle valve 18 which ensures that liquid flow in the delivery line is always accompanied by liquid flow through the venturi, the throttle valve 18 remaining open while appreciable flow through the delivery line is taking place but tending to close as the rate of flow decreases. Alternatively or in addition, the tube 16 may be connected as desired to any other pressure controlled device or simply to a pressure measuring and/or recording apparatus 19 (see FIG. 4).

If the valve member 9 (see FIG. 2) in the branch line 8 is in the closed position, the pressure in the line leading from the device will simply be that in the narrowest part of the throat of the venturi tube 1. If the valve member 9 is opened very slightly, the pressure will increase accordingly, increasing, as the valve member 9 is opened further, until it reaches the full value of the pressure in the line upstream of the throat of the venturi tube 1. Thus by adjusting the position of the valve member 9, it is possible to derive a control pressure varying anywhere between the pressure in the throat of the venturi tube 1 and the pressure upstream of it. The control pressure may therefore be varied as required within these limits to match the pressure at a nozzle downstream of the device even if the length and/or diameter of the hose leading to the nozzle is varied. In the particular example described, the pressure in the throat of the venturi tube 1 for a flow rate of 605 U.S. gallons/minute will be approximately 25 p.s.i. less than that upstream of the throat.

FIG. 5 shows an alternative construction where a second valve is positioned in a pressure sensing line 22 between the throat of the venturi tube 1 and the junction with a branch line 23. The branch line 23 communicates with the upstream end of the venturi tube 1 by a radial passage 24 between which and the pressure sensing line 22 is a bore 25 parallel to the branch line 23 and accommodating a common valve member 26. The branch line control valve is constituted by one end 27 of the valve member 26, while the second valve is constituted by the other end 28 of the valve member 26. O-rings 29 are provided at each end of the valve member 26. At the outer end of the valve member 26 is a reduced spindle 30 terminating in an enlarged portion 31 screw-threaded on its external surface, so that a lock nut 32 may be screwed onto it and tightened against the external surface of the mounting 6 to lock the valve member 26 in any desired position. To ensure against leakage of liquid in operation, a sealing cap 33 is screwed down over the lock nut 32 which is formed with an external screw thread for this purpose, a gasket 34, inserted under the rim of the sealing cap 33, being clamped against the outer surface of the mounting 6. The valves are thus interconnected so that in operation when one is open the other is closed.

It will be appreciated that the invention is applicable to any form of venturi tube and in particular to those tubes having a gradual convergence upstream of the throat, instead of a sudden constriction as described.

I claim as my invention:

A venturi device for providing a variable sensing pressure comprising: a venturi tube, a body affixed to said venturi tube, a pressure sensing line in said body opening into the throat of the venturi tube, a branch line from the pressure sensing line opening into the venturi tube at a point where said venturi tube is of greater cross-section than that at which the pressure sensing line opens into the throat of said venturi tube, a first longitudinally slideable plug control valve in said branch line, said control valve being adjustable between a position in which said branch line is closed to one in which it is open, a second longitudinally slideable plug control valve positioned in said pressure sensing line between the throat of the venturi tube and the junction with said branch line, and a common valve member for said valves so arranged that said valves operate simultaneously in opposite position relationship for adjustment to a desired sensing pressure.

References Cited in the file of this patent
UNITED STATES PATENTS

| | | |
|---|---|---|
| 2,591,195 | Picciano | Apr. 1, 1952 |
| 2,829,664 | Mountford | Apr. 8, 1958 |
| 2,899,824 | Adelson | Aug. 18, 1959 |